United States Patent [19]

Kuroki

[11] Patent Number: 4,500,190
[45] Date of Patent: Feb. 19, 1985

[54] CAMERA SYSTEM INCLUDING FLASH AND STATUS INDICATING CONTROL CIRCUIT

[75] Inventor: Yoshifumi Kuroki, Tokyo, Japan

[73] Assignee: Asahi Kogaku Kogyo Kabushiki Kaisha, Tokyo, Japan

[21] Appl. No.: 577,732

[22] Filed: Feb. 9, 1984

Related U.S. Application Data

[63] Continuation of Ser. No. 384,515, Jun. 3, 1982, abandoned.

[30] Foreign Application Priority Data

Jun. 15, 1981 [JP] Japan .................................. 56-90878

[51] Int. Cl.³ ........................ G03B 15/05; H05B 41/32
[52] U.S. Cl. ............................... 354/416; 354/127.12; 315/241 P; 315/151
[58] Field of Search ............................... 384/416–418, 384/420–423, 127.1, 127.11, 127.12, 268; 315/134, 136, 133, 151, 241 P

[56] References Cited

U.S. PATENT DOCUMENTS 4,315,679  2/1982  Nakamura ..................... 354/60 F X
4,329,624  5/1982  Kamon et al. ................... 354/145 X
4,363,542 12/1982  Kondo et al. ..................... 354/33 X
4,395,100  7/1983  Kondo ................................. 354/33

Primary Examiner—William B. Perkey
Attorney, Agent, or Firm—Fleit, Jacobson, Cohn & Price

[57] ABSTRACT

A camera flash device is provided for photography requiring the use of a flash by transmitting plural information from the flash side to the camera side.

The flash device includes a plural flash signal generation circuit which generates flash signals from said flash side, as well as common terminal to which any two flash signals are sent from said plural flash signal generation circuit.

A control circuit prevents sending one signal of said two signals, both signal pass common terminal, while the other is sent.

4 Claims, 4 Drawing Figures

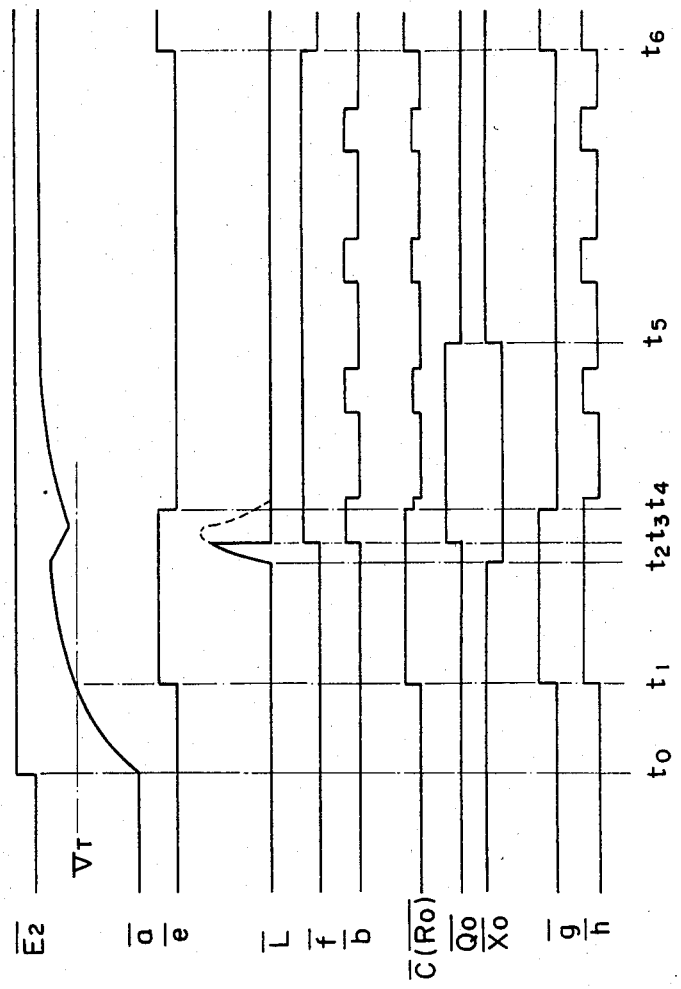

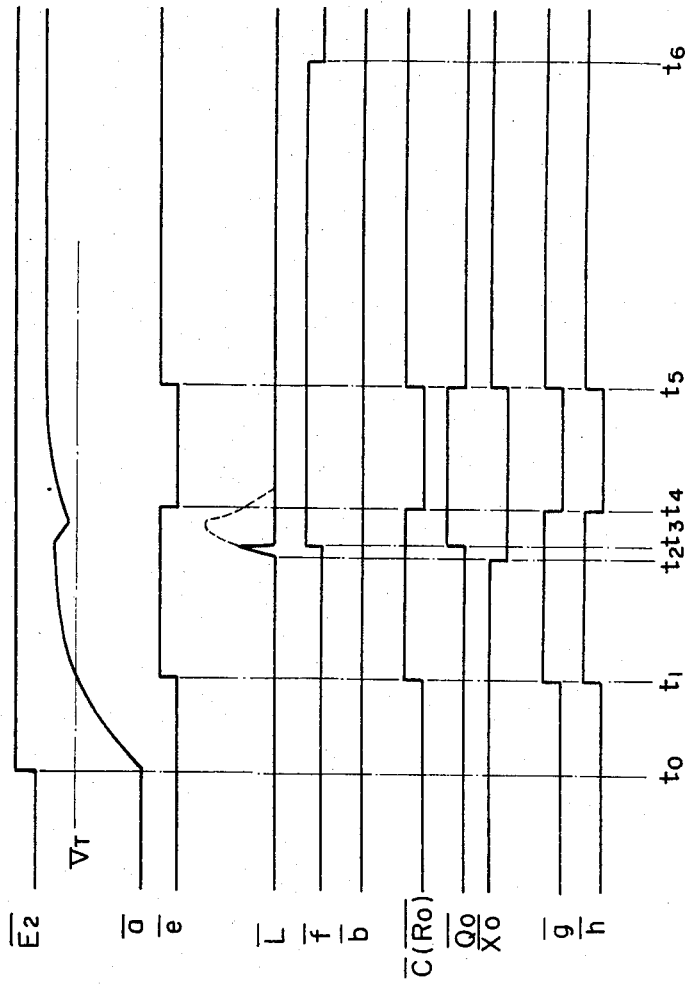

CAMERA SYSTEM INCLUDING FLASH AND STATUS INDICATING CONTROL CIRCUIT

FIELD OF THE INVENTION

The present invention relates to a flash device for use with a photographic camera, arranged to transmit signals to the camera for flashlight photography. It relates more particularly to an "automatic light adjustment" type flash device, which is capable of automatically controlling the duration of the flashlight illumination.

BACKGROUND OF THE INVENTION

A flash device and camera have at their coupling portions electrical terminals through which they are electrically connected to each other. Different signals are transmitted from the flash device to the camera and vice versa through the terminals. For example, a charging completion signal indicative of the completion of charging the flash condenser for energizing the flash tube is transmitted from the flash device to the camera and activates an indicator provided e.g. in the viewfinder of the camera. On the other hand, a synchronizing signal is sent from the camera to the flash device, which signal causes the flash device to flash.

It is desirable that all the pieces of information on the operation of the flash device should be indicated at a particular portion of the camera, e.g. the viewfinder. Recently developed complicated flash devices have more pieces of such information to be indicated, and so the number of the signals carrying the information is larger than before. A larger number of terminals on the coupling portions may permit a larger number of such signals to be transmitted, but it is undesirable to increase the number of the terminals. That is, in the case of a "grip" type flash device which is electrically connected to a camera by means of a multiple-conductor cable, an increase in number of the terminals leads to a corresponding increase in the number of component conductors between the flash device and camera. In the case of a "clip-on" type flash device which has a "foot" portion to be engaged with a corresponding "hot shoe" of a camera, it is difficult to provide many terminals insulated from each other in the tiny hot shoe.

It is thus an object of the present invention to provide a flash device in which the above-mentioned disadvantages are not encountered.

SUMMARY OF THE INVENTION

The flash device includes, according to the present invention, a plurality of electric circuits for generating signals to be sent to the camera, each signal being sent through one of the electric terminals at the coupling portion, includes means for preventing a first one of the signals from being sent through its specified one of the terminals while a second one of the signals is sent through the same terminal, so that the two signals can be sent to the camera through a single terminal.

BRIEF DESCRIPTION OF THE DRAWINGS

The present invention will now be described with reference to the accompanying drawings, in which:

FIGS. 3 and 4 are diagrams showing waveforms occurring at various parts of the circuit of FIG. 2 when a change-over switch in the circuit is kept open and closed, respectively.

DESCRIPTION OF THE PREFERRED EMBODIMENT

Figure 1:
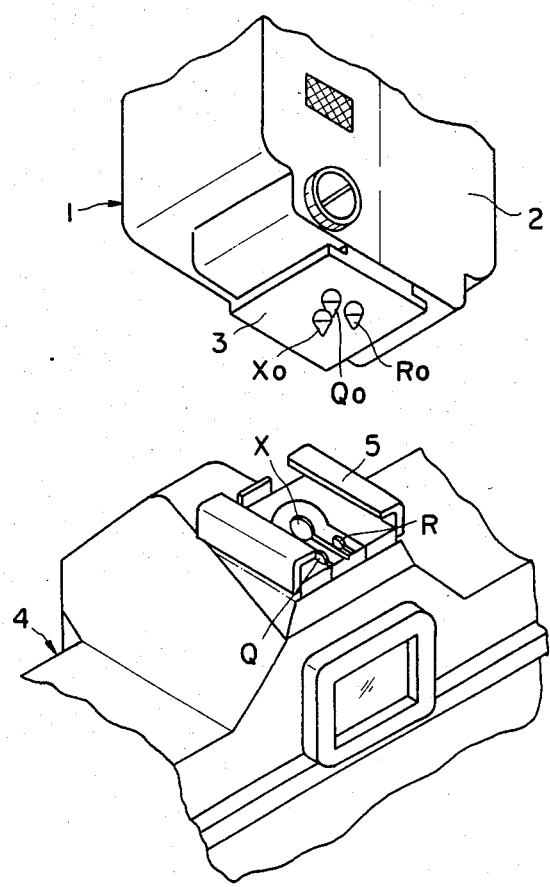
FIG. 1 is a partial perspective view of an embodiment of a clip-on type flash device according to the present invention.

FIG. 1 shows a clip-on type flash device which is an embodiment of the present invention. A mounting foot 3 having spring-urged electric terminals X0, R0 and Q0 is provided on the lower side of the casing of the flash device 1. The foot 3 is engaged with a hot shoe 5 installed on the upper part of a camera 4. The terminals X0, R0 and Q0 of the flash device are kept touching the corresponding electric terminals X, R and Q on the hot shoe, respectively, when the flash device is coupled to the camera. Then, the ground terminal G0 of the flash device also is kept touching the ground terminal G of the camera, so that the flash device and the camera can have a common ground when coupled together (both G0 and G not being shown in FIG. 1).

Figure 2:
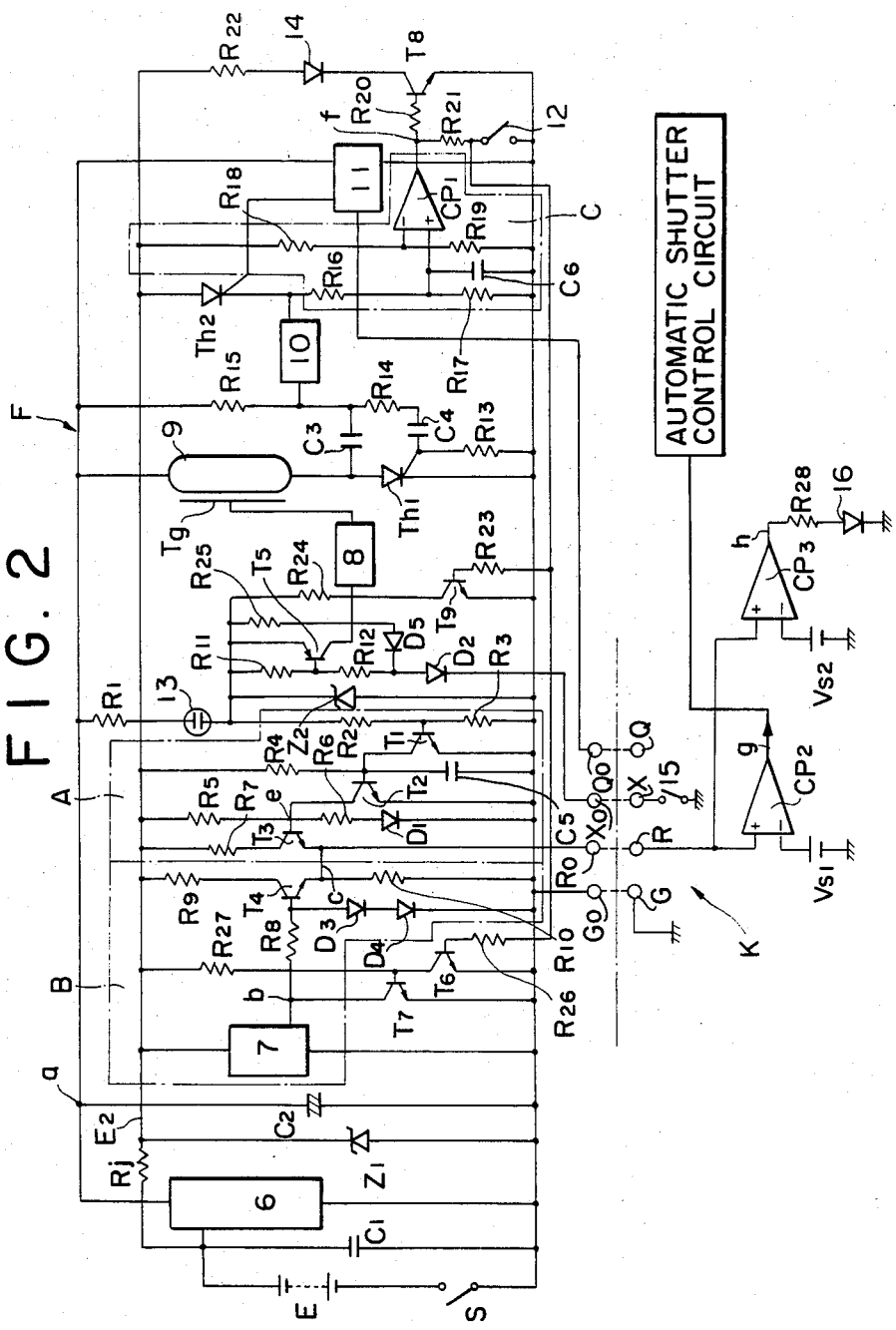
FIG. 2 is a diagram showing the electric circuit of an embodiment of the present invention.

FIG. 2 shows the electric circuit F of a flash device of the present invention and part of the electric circuit K of the camera.

In the circuit F of the flash device, a battery E is connected to a main switch S in series. A condenser C1 is connected to this series circuit in parallel. A converter 6 steps up the output voltage of the battery E to a high d.c. voltage. The condenser C1 prevents fluctuation of the output voltage of the battery E when the converter 6 is activated. A condenser C2 is connected between the output of the converter 6 and the ground. One end of the condenser C2 is connected to an electrode of a discharge light emission tube 9, and the other end is connected to the ground terminal G0. The condenser C2 is charged by the converter 6, and the energy stored therein produces flashlight emitted from the tube 9. An electrode of a neon lamp 13 is connected to the output of the converter 6 through a current limiting resistance R1, while the other electrode of 13 is connected to the cathode of a Zener diode Z2 whose anode is grounded.

When the main switch S is closed, the converter 6 is energized to charge the condenser C2. When the voltage across the condenser C2 has become high enough to fire the light emission tube 9, the neon lamp 13 is turned on and the voltage across the Zener diode Z2 reaches the Zener voltage.

Then, a resistance Rj is connected between the positive pole of the battery E and the cathode of another Zener diode Z1 whose anode is grounded. A charging completion signal generating circuit A is connected in parallel with this Zener diode Z1. The input side of this circuit A has a voltage dividing series circuit of resistances R2 and R3, which voltage divider is connected in parallel with the Zener diode Z2. The output of the voltage divider, or the juncture between R2 and R3, is connected to the base of a transistor T1 whose emitter is grounded. The collector of the transistor T1 is connected to the juncture between resistance R4 and a condenser C5 which are connected in series. The opposite end of R4 is connected to the cathode of the Zener diode Z1, while the opposite end of C5 is grounded. The collector of the transistor T1 is also connected to the base of a transistor T2 whose emitter is grounded. The collector of T2 is connected to the juncture between series-connected resistances R5 and R6. The opposite end of R6 is connected to the anode of a diode D1, while the opposite end of R5 is connected to the cathode of the Zener diode Z1. The cathode of the diode D1 is grounded.

The collector of the transistor T2 is connected to the base of a transistor T3. The collector of the transistor T3 is connected through a resistance R7 to the cathode of the Zener diode Z1, while the emitter of T3 is connected to the terminal R0.

When the voltage across the Zener diode Z1 reaches the Zener voltage and another Zener diode Z2 reaches the Zener voltage with the neon lamp 13 turned on, the transistor T1 is activated, and then the discharge from the condenser C5 turns off the transistor T2. The transistor T3 is then activated and thus the level at the terminal R0 becomes high. This high level signal, or the charging completion signal, is sent to the camera.

Said diode D1 is connected for temperature compensation of the transistor T3. This reduces the temperature dependency of the charge completion signal.

Series-connected resistances R11 and R12 are connected to the cathode of the Zener diode Z2. The base of a transistor T5 is connected to the juncture between R11 and R12. The emitter of this transistor T5 is connected to the cathode of the diode Z2. One end of a resistance R25 is connected to the emitter of T5, and the other end of R25 is connected to the anode of a diode D5. This diode D5 is connected in series to another diode D2. The cathode of the diode D2 is connected to the terminal X0, and one end of the resistance R12 is connected to the juncture between the diode D2 and D5. A trigger electrode Tg of the discharge light emission tube 9 is connected to the collector of the transistor T5 through a trigger circuit 8. An electrode of the tube 9 is connected to the anode of a thyristor Th1 whose cathode is grounded.

The terminal X0 of the flash device touches the terminal X of the camera. The terminal X is connected to an X contact 15 of the camera. The X contact is connected to the ground when closed, as illustrated in FIG. 2.

When the X contact is closed, the transistor T5 is turned on and the trigger circuit 8 is activated. The trigger circuit 8 then produces a trigger voltage which is applied to the trigger electrode Tg, whereby electric discharge is caused through the tube 9 and light is emitted therefrom.

A light adjustment circuit 11 is connected between the output of said converter 6 and the ground. The input of the circuit 11 is connected to the terminal Q0 of the flash device. Terminal Q0 can be connected to the terminal Q of the camera.

The output of the light adjustment circuit 11 is connected to the gate of a thyristor Th2 whose anode is connected to the cathode of the Zener diode Z1. The cathode of the thyristor Th2 is connected through series-connected resistances R16 and R17 to the ground. These resistances are included in a timer circuit C to be described later. The cathode of the thyristor Th2 is connected through a light emission termination circuit 10 to the juncture of series-connected resistances R14 and R15, the juncture being connected through a commutation condenser C3 to the anode of the Thyristor Th1. The opposite end of the resistance R15 is connected to the output of the converter 6, while the opposite end of R14 is connected through a coupling condenser C4 to the gate of the thyristor Th1, this gate being connected through a resistance R13 to the ground.

The light adjustment circuit is activated in response to a light adjustment signal sent to the input thereof, e.g., from the camera through the terminals Q and Q0. Then the light adjustment circuit 11 produces an output to turn the thyristor Th2 on thereby to activate the light emission termination circuit 10 which in turn permits the condenser C3 to discharge the electricity stored therein. The thyristor Th1 is turned off in response to the discharge of the condenser C3, whereby the light emission from the tube 9 is terminated.

The above-mentioned timer circuit C will now be described. The juncture between the resistances R16 and R17 is connected to the non-inverting input of a comparator CP1. The resistance R17 and a condenser C6 connected in parallel therewith form a integrating circuit. The inverting input of the comparator CP1 is connected to the juncture of series-connected resistances R18 and R19. The opposite ends of the resistances R18 and R19 are connected to the anode of the thyristor Th2 and to ground, respectively.

The output of the comparator CP1 is connected through a resistance R20 to the base of a transistor T8. The output of CP1 is also connected through a resistance R21 to a contact of a switch 12 whose another contact is grounded. The contact of the switch 12 connected to the resistance R21 is also connected to resistances R23 and R26.

After the thyristor Th2 is turned on by the output from the light adjustment circuit 11, an electric current is permitted to flow through the thyristor Th2. The current charges the condenser C6 so that the voltage across this condenser and consequently the potential at the non-inverting input of the comparator CP1 rise. As the voltage across the condenser C6 rises, the voltage across the thyristor Th2 correspondingly falls. At the moment this latter voltage reaches a particular value, the thyristor Th2 becomes non-conductive. In this embodiment, the particular value is reached when the potential at the non-inverting input of the comparator CP1 becomes equal to that at the inverting input thereof and thus the output level turns high. In response to the change in state from ON to OFF of the thyristor Th2, the discharge of the condenser C6 is initiated, and the output from the comparator CP1 becomes low after a time interval, e.g. 1.5 sec., which is determined by the time constant of the integrating circuit C6, R17.

The emitter of the transistor T8 of this element 14 is connected through a resistance R22 to the cathode of the Zener diode Z1. When the transistor T8 is turned on in response to the high level output from the comparator CP1, the element emits light which indicates the correct operation of the light adjustment circuit 11.

The output of a light adjustment signal generating circuit B is connected to the terminal R0 as is the output of charging completion circuit A. The circuit B includes an oscillator 7 connected between the anode and cathode of the Zener diode Z1. The oscillator 7 is constituted by an astable multivibrator, for example. The output of the oscillator 7 is connected to the collector of a transistor T7, and to the base of a transistor T4 through a resistance R8. The emitter of the transistor T7 is grounded, while its base is connected to the collector of another transistor T6, which collector is connected through a resistance R27 to the cathode of the Zener diode Z1. The transistor T6 has its emitter grounded and its base connected through a resistance R26 to a contact of a change-over switch 12. Between the base of the transistor T4 and the ground, there is provided series-connected diodes D3 and D4 for temperature compensation. The collector of the transistor T4 is connected through a resistance R9 to the cathode of the Zener diode Z1, while its emitter is connected through a resistance R10 to the ground, on the one hand, and directly connected to the terminal R0, on the other hand. A transistor T9 has its emitter grounded and its collector connected through a resistance R24 to the emitter of the transistor T5.

The oscillator 7 is arranged to produce a periodic pulse train, or the light adjustment display signal, when the transistor T7 connected to the output thereof is nonconductive. The frequency of the output is, e.g., 2.5 Hz; the duty factor is e.g. 1-to-3; the voltage is, e.g., 1.2 Volts.

Thus, if the light adjustment circuit 11 is activated and, as a result, the output level from the comparator CP1 turns high when the change-over switch 12 is open, the transistors T6 and T9 are turned on by a control signal. When the transistor T9 is turned on, the Zener voltage of the Zener diode Z2 is reduced and the transistor T1 is turned off, and the charging completion signal from the charging completion signal generating circuit A is terminated. On the other hand, when the transistor T6 is turned on, the transistor T7 is turned off and the oscillator 7 starts to produce the output signal and thus the light adjustment display signal is sent through the terminal R0.

As can be understood from the above description, through the terminal R0 two signals are sent from the flash device to the camera, namely, the charging completion signal and the light adjustment display signal. A control circuit composed of the transistors T6 and T9 and other elements is provided, which stops production of the charging completion signal when the light adjustment signal is sent through the terminal R0. The control circuit is designed such that the transistor T9 is turned on to reduce the potential at the base of the transistor T1, or the input terminal of the charging completion signal generating circuit A, to the low level and at the same time the transistor T6 is turned on to raise the potential at the output of the oscillator 7 from low to high thereby to raise the potential at the emitter of the transistor T4 to the high level.

The charging completion signal and the light adjustment display signal are sent from the flash device to the camera through the terminal R0 in this embodiment. However, other embodiments in which other signals are sent through the terminal R0 are possible.

If the change-over switch 12 is kept closed, the transistor T9 is kept nonconductive and therefore the Zener voltage across the Zener diode Z2 will not be reduced even if the light adjustment circuit 11 is activated, so that the charging completion signal is continuously produced. At the same time, the transistor T6 is also kept nonconductive while the transistor T7 is kept conductive, so that the oscillator 7 can not produce its output signal. Thus, if the switch 12 is closed, the charging completion signal alone can be sent through the terminal R0.

The electric circuit K of the camera will now be briefly described. The non-inverting input of a comparator CP2 is connected to the terminal R, the inverting input of which is connected to the positive pole of a reference voltage source Vs1 whose negative pole is grounded. To the output of the comparator CP2, an automatic shutter controlling circuit is connected. The non-inverting input of another comparator CP3 is connected to the terminal R. The inverting input of CP3 is connected to the positive pole of another reference voltage source Vs2 whose negative pole is grounded. The output of CP3 is connected to the ground through a series circuit of a resistance R28 and a light emitting diode 16.

Thus, the diode 16 emits light in response to the charging completion signal or the light adjustment display signal supplied through the terminal R.

The operation of the flash device according to the present invention will now be described with reference to the time charts shown in FIGS. 3 and 4.

FIG. 3 shows the operation in the case of the change-over switch 12 being kept open. At an instant t0 the main switch S is closed and the converter 6 is energized to charge the condenser C2. The voltage across the condenser C2 or the potential at the point a then changes following a waveform $\bar{a}$. The voltage across the Zener diode Z1 or the potential at the point E2 changes following a waveform $\overline{E2}$.

At the instant the potential at the point a reaches a value $V_T$, the neon lamp 13 is turned on; the transistor T1 is turned on; the transistor T2 is turned off; the transistor T3 is turned on; the potential at a point e turns high as shown by a waveform $\bar{e}$. Thus, the potential at a point c or the terminal R0 turns high as shown by a waveform $\overline{R0}$. Thus, the outputs of the comparators CP2 and CP3 of the camera turn high, and as a result the light emitting diode 16 emit light.

Then the camera is released. At the instant the X contact 15 is closed, the potential at the terminal X0 turns low (waveform $\overline{X0}$); the transistor T5 is turned on; the trigger circuit 8 is activated; and the discharge light emission tube 9 emits light (waveform $\bar{L}$). At that time, the transistor T1 is turned off, but the transistor T3 is not simultaneously turned off due to the condenser C5 charged. The transistor T3 is turned off e.g. 2 msec. after, at a time point t4.

The time interval of 2 msec. is long enough for the discharge light emission tube 9 to complete light emissions therefrom. After the time point t4, the shutter of the camera is compulsorily closed. In the case of an automatic exposure control camera wherein an automatic shutter control circuit serves to keep the shutter open until a photometer signals that the quantity of light received by the camera has reached the correct exposure level, in the event the received quantity of light falls short of the correct exposure level at the time when the light emissions from the flash device terminate, the automatic shutter control circuit will keep the shutter open until available light supplies the shortage with the result that the exposure is continued for too long a time and thus a blurred photograph is taken; to avoid such occurrence, the condenser C5 is provided, which delays the time when the charging completion signal ceases.

If an appropriate exposure is obtained and thus the light adjustment circuit 11 is activated either in response to a light adjustment signal supplied through the terminal Q0 or another light adjustment signal produced in the flash device at a time point t3, then the light emission termination circuit 10 stops the light emission from the tube 9.

When the light emission termination circuit 10 is activated, the output level from the comparator CP1 turns high (waveform $\bar{f}$ at a point f); simultaneously transistor T6 turns on; transistor T7 turns off; the oscillator 7 starts to produce the oscillating output (waveform $\bar{b}$ at a point b); and a waveform $\overline{R0}$ occurs at the terminal R0. At that time, the comparator CP3 follows a waveform h̄ as shown, and the light emitting diode 16 starts to emit light intermittently.

At the point f, the timer circuit C maintains a high level signal for 1.5 sec. (until a time point t6). Thus, during such period the light adjustment display signal alone is sent through the terminal R0 even if the X contact 15 is opened (at a time point t5), because the transistors T6 and T9 are then in the ON state.

If the level at the point f turns low at a time point t6, the transistors T6 and T9 are turned off and only the charging completion signal then arises at the terminal R0.

FIG. 4 shows the waveforms in the case of the change-over switch 12 being closed. In this case, if at the time point t3 the light adjustment circuit 11 is activated and as a result the output level from the comparator CP1 turns high and thus light is emitted from the light emitting element 14, the light adjustment display signal cannot be generated (see waveform b̄) because the transistors T6 and T9 are then in the OFF state. After the time point t5, the charging completion signal alone is sent through the terminal R0 (see waveform R̄0̄).

The change-over switch 12 provides the following merit: If the switch is not provided, the light adjustment display signal is produced but the charging completion signal is not produced in the presence of the output signal from the timer circuit C, even when only a small portion of the energy stored in the condenser C2 is discharged through the tube 9 for taking one photograph and the major portion of the energy is left and so another flashlight can be immediately emitted from the tube 9. Thus the time interval between successive exposures cannot be shorter than the time constant of the timer circuit C. However, if the switch is provided and kept closed, the charging completion signal will be immediately displayed after an exposure, so long as the energy discharged in the exposure is little. Thus the switch 12 permits flashlight photography to be made successively at shorter intervals.

Having thus described the invention, what is claimed is:

1. In a camera system which includes a plurality of electrical terminals for connecting a flash device with a photographic camera, wherein said flash device includes a flash tube for producing light emissions, a condenser for accumulating a voltage of a firing level to discharge the flash tube, and means for automatically terminating light emissions from the flash tube when an appropriate exposure level is reached during flashlight photography; the improvement comprising:
   a charge completion circuit for producing a charge completion signal of a predetermined level when the voltage of the condenser reaches the firing level;
   a light adjustment display circuit for producing, after termination of light emissions from said flash tube, a light adjustment display signal composed of a periodic pulse train;
   a timer circuit for producing a control signal to inhibit the production of the charge completion signal for a predetermined period of time after termination of light emissions from the flash tube and to actuate said light adjustment display circuit;
   a common electrical terminal interposed between the flash device and the camera and coupled to said charge completion circuit and said light adjustment display circuit through which the charge completion signal and the light adjustment display signal are transmitted; and
   a changeover switch connected to said timer circuit for interrupting said control signal thereby to pass the charge completion signal to the camera in preference to the light adjustment display signal when the voltage across the condenser remains above the firing level after discharge of the flash tube.

2. In combination,
   a camera for taking flashlight photography;
   a flash device which includes a flash tube for producing light emissions, a condenser for accumulating voltage of a firing level to discharge the flash tube, and means for automatically terminating light emissions from the flash tube when an appropriate exposure level is reached during flashlight photography;
   a plurality of respective electrical terminals for interconnecting the camera and the flash device for transferring electrical signals therebetween;
   a charge completion circuit for producing a charge completion signal of a predetermined level when the voltage across the condenser reaches the firing level;
   a light adjustment display circuit for producing, after termination of light emissions from the flash tube, a light adjustment display signal composed of a periodic pulse train;
   a timer circuit for producing a control signal to inhibit the production of the charge completion signal for a predetermined period of time after termination of light emissions from the flash tube and to actuate said light adjustment display circuit;
   at least one common electrical terminal for interconnecting the flash device and the camera and coupled to said charge completion circuit and said light adjustment circuit through which said charge completion signal and said light adjustment display signal are transmitted; and
   a changeover switch connected to said timer circuit for interrupting said control signal thereby to pass the charge completion signal to the camera in preference to the light adjustment display signal when the voltage across the condenser remains above the firing level after discharge of the flash tube.

3. A flash and status indicating circuit as part of a flash device which includes a plurality of electrical terminals for connecting said flash device with a photographic camera, said flash device includes a flash tube for producing light emissions, a condenser for accumulating a voltage of a firing level to discharge the flash tube, and means for automatically terminating light emissions from the flash tube when an appropriate exposure level is reached during flashlight photography; said flash and status indicating circuit comprising:
   a charge completion circuit for producing a charge completion signal of a predetermined level when the voltage of the condenser reaches the firing level;
   a light adjustment display circuit for producing, after termination of light emissions from said flash tube, a light adjustment display signal composed of a periodic pulse train;
   a timer circuit for producing a control signal to inhibit the production of the charge completion signal for a predetermined period of time after termination of light emissions from the flash tube and to actuate said light adjustment display circuit;

a common electrical terminal interposed between the flash device and the camera and coupled to said charge completion circuit and said light adjustment display circuit through which the charge completion signal and the light adjustment display signal are transmitted; and a changeover switch connected to said timer circuit for interrupting said control signal thereby to pass the charge completion signal to the camera in preference to the light adjustment display signal when the voltage across the condenser remains above the firing level after discharge of the flash tube.

4. A flash unit for taking flashlight photographs with a camera, said camera generating a flash control signal, said flash unit comprising:

a flash device which includes a flash tube for producing light emissions, and a condenser for accumulating voltage of a firing level to discharge the flash tube, said flash device being actuated by said flash control signal;

a plurality of respective electrical terminals for interconnecting said camera and said flash unit for transferring electrical signals therebetween, one of said electrical signals being said flash control signal;

a charge completion circuit for producing a charge completion signal when the voltage across the condenser reaches the firing level;

a light adjustment display circuit for producing, after termination of light emissions from the flash tube, a light adjustment display signal composed of a periodic pulse train;

a timer circuit for producing a control signal to inhibit the production of the charge completion signal for a predetermined period of time after termination of light emissions from the flash tube and to actuate said light adjustment display circuit;

at least one common electrical terminal for interconnecting the flash device and the camera coupled to said charge completion circuit and said light adjustment circuit through which said charge completion signal and said light adjustment display signal are transmitted; and a changeover switch connected to said timer circuit for interrupting said control signal thereby to pass the charge completion signal to the camera in preference to the light adjustment display signal when the voltage across the condenser remains above the firing level after discharge of the flash tube.

* * * * *